United States Patent [19]

Calupca et al.

[11] Patent Number: 4,788,825
[45] Date of Patent: Dec. 6, 1988

[54] OIL SEPARATOR

[75] Inventors: Gary A. Calupca; Lewis L. Crone; William Maxey, III, all of York; Eckahard K. Rubenic, Mechanicsburg, all of Pa.

[73] Assignee: FES, Inc., York, Pa.

[21] Appl. No.: 162,837

[22] Filed: Mar. 2, 1988

[51] Int. Cl.$^4$ .............................................. F25B 43/02
[52] U.S. Cl. ............................................ 62/84; 55/321; 55/323; 55/325; 55/482; 62/470
[58] Field of Search ................. 62/470, 84, 468; 418/DIG. 1; 55/321, 323, 325, 482

[56] References Cited

U.S. PATENT DOCUMENTS

| | | | |
|---|---|---|---|
| 1,415,418 | 5/1922 | Wachtel | 55/323 |
| 1,793,064 | 2/1931 | Cuthbert | 62/468 X |
| 2,405,625 | 8/1946 | Whiton et al. | 55/323 |
| 3,070,977 | 1/1963 | Kimmel et al. | 62/84 X |
| 3,283,532 | 11/1966 | Kocher | 62/84 X |
| 3,408,828 | 11/1968 | Soumerai et al. | 62/470 |
| 4,204,846 | 5/1970 | Brenholt | 55/482 X |
| 4,350,504 | 9/1982 | Drachuk | 55/323 X |
| 4,662,190 | 5/1987 | Tischer | 62/470 |
| 4,666,473 | 5/1987 | Gerdau | 55/321 X |
| 4,708,723 | 11/1987 | Howeth | 55/321 |

Primary Examiner—William E. Tapolcai
Attorney, Agent, or Firm—David J. Zobkiw

[57] ABSTRACT

Oil separation for a horizontal refrigeration screw compressor is achieved in a series of steps which achieves nearly oil-free refrigerant gas. The refrigerant is discharged from the compressor into a generally cylindrical shell which is divided into three chambers. A generally horizontal, but slightly tilted, divider plate unequally divides the cylindrical shell into two chambers for the greater portion of the cylindrical shell. A cylindrical chamber at the end of the cylindrical shell provides fluid communication between the other two chambers. The compressor discharge is located in the lower and larger chamber which is a segment of a circle portion which also contains the oil sump. A discharge deflector turns the compressor discharge flow at least 90°, but as much as 135°, and causes it to impact upon the lower surface of the divider plate and depositing oil thereon. The flow striking the divider plate is deflected 180° and is caused to turn approximately 90° to flow past a baffle plate. The entire flow passes serially through two demisters into the cylindrical chamber where it is deflected 180° and the entire flow passes through a coalescer into the upper chamber which is smaller segment of a circle portion. The nearly oil-free refrigerant gas then is delivered to the refrigeration system.

9 Claims, 5 Drawing Sheets

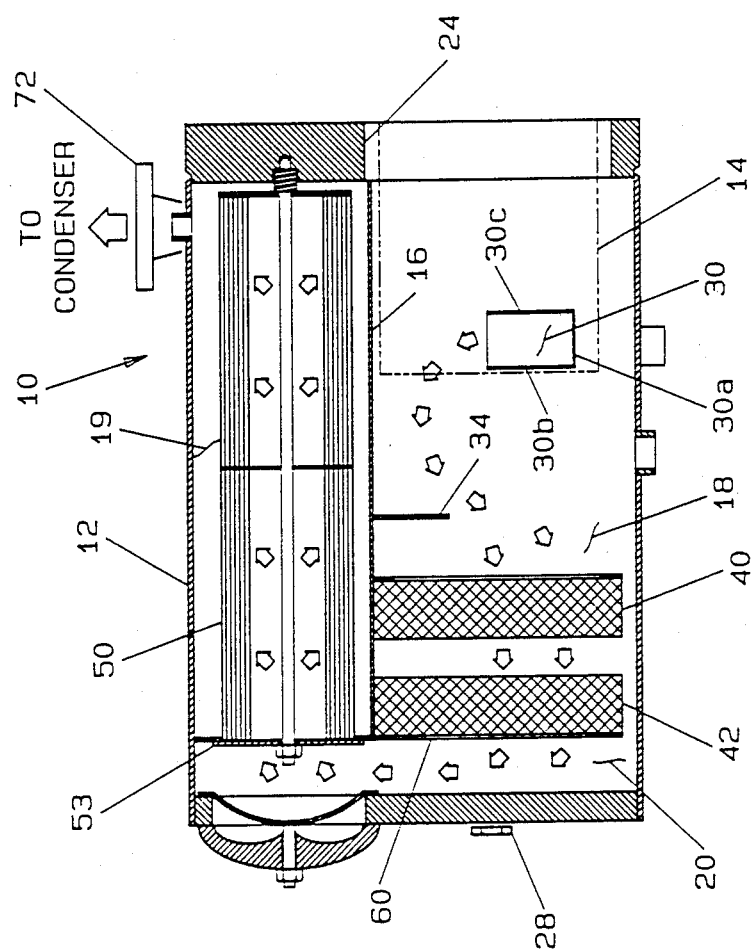

OIL SEPARATOR

BACKGROUND OF THE INVENTION

Screw compressors employed in refrigeration applications commonly use oil for sealing, lubricating and cooling. The oil is injected into the working chamber of the compressor and thus into the refrigerant gas being compressed. As a result, the compressor discharge ordinarily contains oil entrained in the compressed refrigerant gas. The presence of oil interferes with the heat exchange function of the refrigeration system and otherwise degrades the efficiency of the system. Generally, the amount of oil carried over is kept as low as possible in order to minimize the degrading of the heat transfer surfaces, to minimize the return of oil from remote locations in the system and to keep a sufficient oil supply in the oil sump for sealing, lubricating and cooling needs. The oil removal or separation ordinarily takes place at a convenient place between the compressor discharge and the condenser.

SUMMARY OF THE INVENTION

The present invention employs a plurality of flow direction changes in combination with a discharge deflector, demisters and a coalescer to remove and collect oil entrained in the refrigerant gas. Except for oil removed in the coalescer, all of the separated oil drains directly into the oil sump. The refrigerant gas and entrained oil is subjected to at least two impingements with a resulting change in direction to inertially remove as much oil as possible prior to reaching the demisters where the amount of oil removal has a direct, temporary effect on the demisters and their flow resistances as the entrained oil impinges, collects and drains to the sump.

It is an object of this invention to provide efficient oil separation in a screw compressor.

It is another object of this invention to provide an oil separator which drains most of the separated oil directly to the oil sump. These objects, and others as will become apparent hereinafter, are accomplished by the present invention.

Basically the discharge from a horizontal screw compressor is directed radially and in a generally downward direction where it impinges upon the surface of the oil and/or a discharge deflector. The discharge deflector is generally in the shape of an arcuate trough about 45°–50° in extent. The arcuate portion is spaced from the compressor discharge and the discharge deflector surrounds the compressor discharge. Impingement of the discharge flow with the surface of the oil in the trough and/or the discharge deflector produces a directional flow change with a portion of the oil collecting in the oil pool and/or on the trough surface due to inertial forces as the flow direction changes. The trough guides the flow upwardly along its inner surface so that it impinges upon the lower surface of the divider plate which is titled a few degrees from horizontal such that oil striking and collecting on the lower surface flows along the tilted surface and drains back to the sump by gravity. The discharge flow changes direction due to its impingement upon the lower surface and impinges upon and is diverted by a baffle plate extending downwardly from the divider plate which also collects oil impinging thereon due to inertia. The discharge flow then serially passes through two demister pads, impinges upon the end of the oil separator housing and is diverted upward. The flow then turns to enter the coalescer completing a 180° change of direction after passing through the demisters. The flow passes through the walls of the coalescer leaving any entrained oil trapped in the coalescing media of the element. The coalesced oil gathers on the outside diameter of the coalescer and drops onto the upper surface of the tilted divider plate and is withdrawn via the oil return connection and passes back to a lower pressure section of the compressor. The refrigerant gas, now nearly oil free, exits the separator and is delivered to the condenser of the refrigeration system.

BRIEF DESCRIPTION OF THE DRAWINGS

For a fuller understanding of the present invention, reference should now be made to the following detailed description thereof taken in conjunction with the accompanying drawings wherein:

FIG. 5 is a sectional view taken along line 5—5 of FIG. 2.

DESCRIPTION OF THE PREFERRED EMBODIMENT

Figure 3:
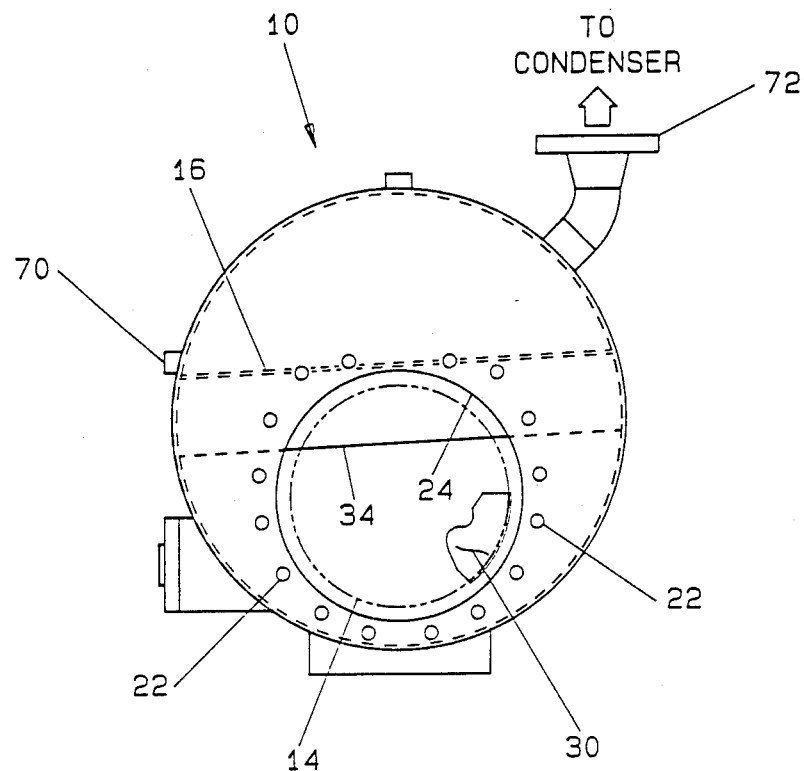
FIG. 3 is a second end view of the FIG. 1 device.
Figure 4:
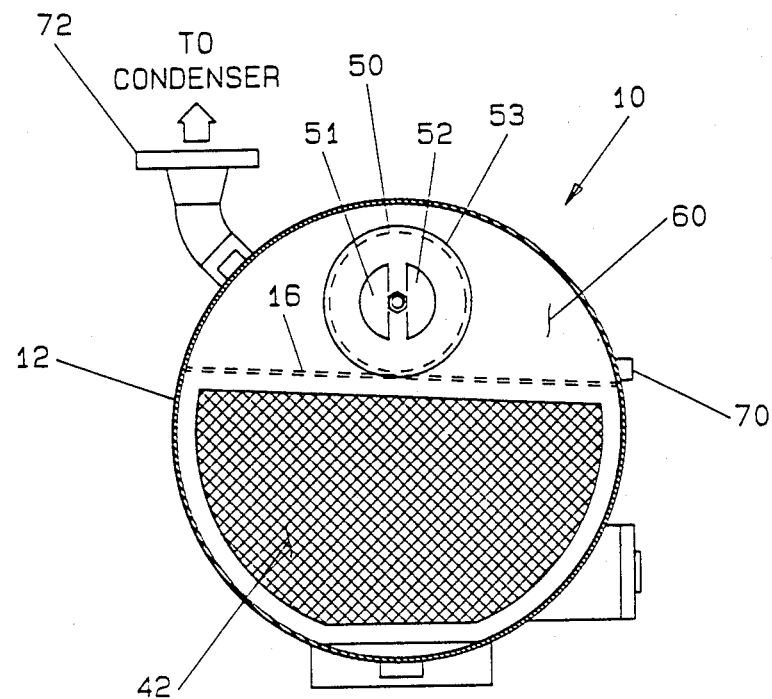
FIG. 4 is a sectional view taken along line 4—4 of FIG. 1.

In the Figures, the numeral 10 generally indicates the oil separator of the present invention. The external portion of the oil separator 10 is an essentially cylindrical shaped casing 12 which is bolted or otherwise suitably secured to the casing of a screw compressor and receives therein a portion of the cylinder/rotor assembly 14 which is shown in phantom in FIGS. 1, 3 and 5. Casing 12 is partitioned by divider plate 16 which, as best shown in FIG. 5, does not extend the full length of casing 12. Divider plate 16 is welded to segmental baffle seal 60 to divide casing 12 into chambers 18 and 19. Referring now to FIGS. 3 and 4, it will be noted that divider plate 16, shown in phantom, is tilted a few degrees, e.g. 1°–6° with 3° preferred, from horizontal and that the portion of the casing 12 below divider plate 16 defines a major segment of a circle which defines chamber 18 and a minor segment of a circle which defines chamber 19. Cylindrical chamber 20 is located in the portion of casing 12 which is not partitioned by divider plate 16 and is defined in part by baffle seal 60.

Figure 1:
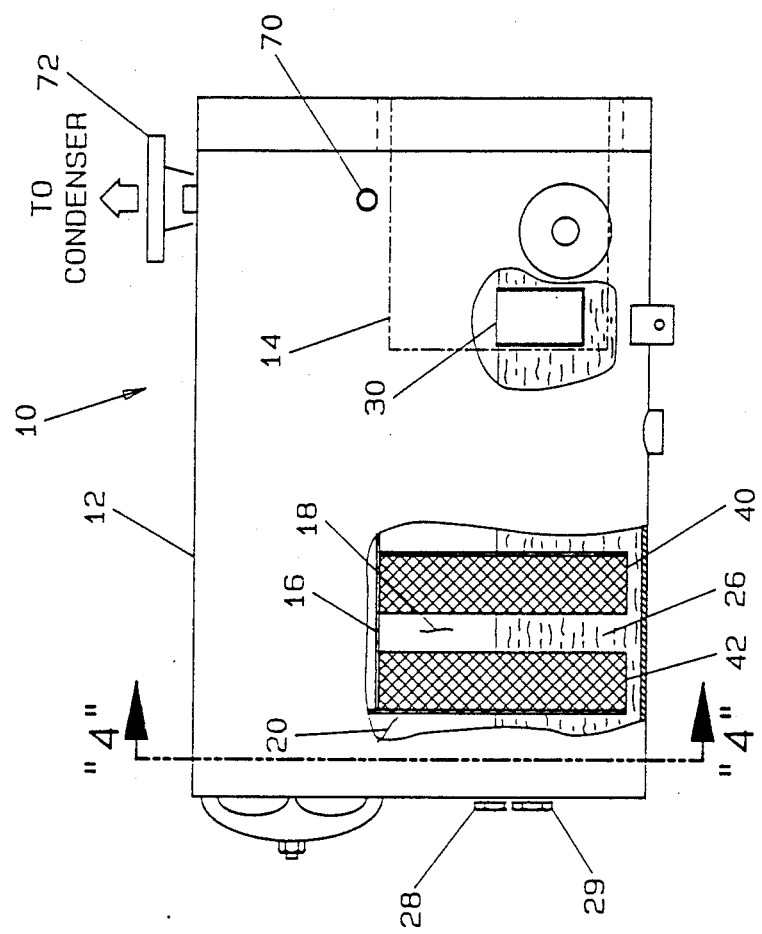
FIG. 1 is partially cut away side view of the oil separator of the present invention.
Figure 2:
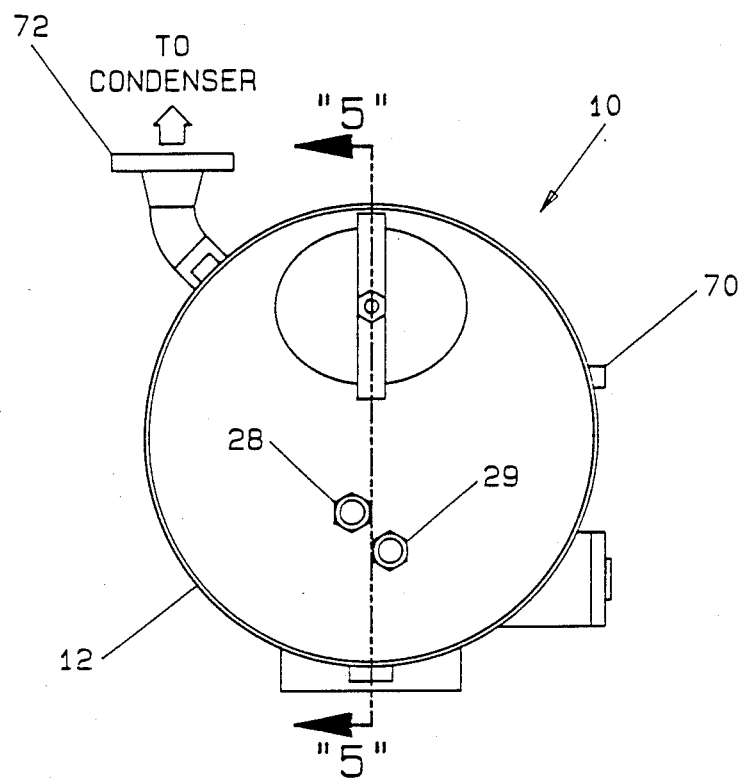
FIG. 2 is a first end view of the FIG. 1 device.

A horizontal screw compressor of which only the rotor and cylinder assembly 14 is shown, and then only in phantom, is attached to casing 12 by bolts (not illustrated) which are threaded into tapped bolt holes 22. The cylinder/rotor assembly 14 extends through opening 24 of casing 12. As best shown in FIG. 1, the level of the oil in oil sump 26 is generally in the level range indicated by sightglasses 28 and 29 and the cylinder/rotor assembly 14 is normally partially submerged in the oil. The compressor discharge is in the form of a radial discharge at an angle of approximately 45° below horizontal and thus would normally impinge upon the surface of the oil sump 26 or could possibly be below the surface of the oil sump 26. This could cause entrainment of oil from the oil sump into the compressor discharge gas which already contains oil and exacerbate the oil removal problem.

As the first step of oil removal, a discharge deflector 30 is provided which is shown in FIGS. 1, 3 and 5 with FIGS. 1 and 5 providing a view of discharge deflector 30 essentially as viewed from the compressor discharge. Discharge deflector 30, as best shown in FIG. 3, provides an arcuate guide approximately 45°–50° in extent. The arcuate surface 30a together with side walls 30b and c, which conform to the shape of cylinder/rotor assembly 14, forms an arcuate trough surrounding cylinder/rotor assembly 14 at the discharge which has only an upwardly extending outlet when coacting with cylinder/rotor assembly 14. Since the discharge deflector 30 extends below the surface of the oil sump 26, oil tends to be present there at the same liquid level. However, depending upon several factors such as the degree of sealing between the discharge deflector 30 and the cylinder/rotor assembly 14, the oil sump level and the amount and velocity of the discharge, oil may be partially splashed out of the trough defined by the discharge deflector 30. The compressor discharge gas impinging upon the discharge deflector 30 may loose some entrained oil due to inertial forces upon being deflected but oil may also be entrained as a result of splashing.

With reference to FIGS. 3 and 5, the discharge flow from the upwardly extending outlet defined by cylinder/rotor assembly 14 and discharge deflector 30 is in the form of a vertically upward flow on one side of the cylinder/rotor assembly 14 which impinges upon the bottom surface of tilted but generally horizontal divider plate 16. Impingement of the discharge flow with divider plate 16 produces a change in flow direction as indicated by the arrows in FIG. 5 and due to inertial forces separates out a quantity of the entrained oil in large droplet form which deposits on the divider plate 16, the oil deposited on the divider plate 16 drips in droplets and/or, because of the tilt, flows by gravity to the interior wall of casing 12 defining chamber 18 and then flows downwardly to oil sump 26.

The discharge flow impinging upon the bottom of divider plate 16 is diverted by approximately 180° and dispersed over a larger flow area and then must again turn through approximately 90° to flow past baffle plate 34 and each of these directional changes tends to produce removal of oil by the action of inertial forces which tend to propel the entrained oil in a straight path.

The refrigerant gas, which now contains only fine droplets or a mist of oil, passes serially through demister pads 40 and 42, respectively, which, as best shown in FIG. 1, are partially immersed in the oil sump 26. The demister pads 40 and 42 remove oil by impingement and as the oil gathers in the fine wire mesh of the pads, it drains downwardly by gravity to maintain the oil reservoir defined by sump 26. Demister pads can extract as much as 99.9% of the oil still in circulation when it reaches the demister pads. The preliminary removal of the large oil droplets is therefore necessary to prevent overwhelming the demister pads and greatly increasing flow resistance. The demister pad 42 together with segmental baffle seal 60 serve to define and separate the chamber 20 from chambers 18 and 19.

As the now relatively oil-free refrigerant gas passes through demister pad 42 into chamber 20, it must make another 180° change in direction since, as best shown in FIG. 4, the only exit from chamber 20 is via openings 51 and 52 in plate 53 which open into coalescer 50. Plate 53 of coalescer 50 is bolted to segmental baffle seal 60 with a gasket therebetween. Coalescer 50 is, in part, made of fiberglass and of a generally cylindrical shape and with no openings other than 51 and 52 which serve only as inlets. The refrigerant gas entering coalescer 50 via openings 51 and 52 must pass through the cylindrical fiberglass walls to reach chamber 19 thereby leaving any entrained oil trapped in the coalescing media of coalescer 50. The coalesced oil gathers on the outside surface of coalescer 50 and drops downward, by gravity, as gravitational forces in the collected oil overcome viscous forces. This oil gathers on the top of tilted divider plate 16 and flows downwardly to the lowest portion of chamber 19 from which it is removed via oil return connection 70 and taken to a lower pressure section of the compressor. If desired, a depression may be formed in plate 16 adjacent connection 70 to further aid in collecting the oil by forming a well. The now nearly oil free refrigerant gas passes from coalescer 50 into chamber 19 and exits oil separator 10 via gas outlet connection 72 and is delivered to the condenser (not illustrated).

The oil collected and maintained in oil sump 26 is either re-injected into a lower pressure area of the compressor by pressure differential or passed through a pump (not illustrated) where its pressure is raised to be delivered back to the compressor. The oil is injected into the compressor to seal, lubricate and cool the mechanism.

Although a preferred embodiment of the present invention has been illustrated and described, other changes will occur to those skilled in the art. For example, the tilt of divider plate 16 can be increased from the preferred 3° to change the discharge gas flow path and/or to control whether oil drips and/or flows from divider plate 16 and in what proportions. It is therefore intended that the scope of the present invention is to be limited only by the scope of the appended claims.

What is claimed is:

1. An oil separator for a horizontal screw compressor:

a generally cylindrical member having a closed first end and having a second end having an opening therein for receiving the rotor assembly of a screw compressor;

baffle seal means spaced from said closed first end and defining therewith a first chamber;

generally horizontal divider plate means extending between said baffle seal means and said second end so as to divide said generally cylindrical member to thereby define second and third chambers with said second chamber being beneath and larger than said third chamber;

said opening in said second end communicates with said second chamber whereby said second chamber is adapted to receive the rotor assembly;

discharge deflector means in said second chamber for directing compressor discharge upwardly so as to impinge upon said divider plate means and deposit entrained oil thereon;

demister means in said second chamber and coacting with said baffle seal means whereby compressor discharge must pass through said demister means to reach said first chamber;

coalescer means located in said third chamber and in fluid communication with said first chamber whereby compressor discharge passing from said demister means is diverted approximately 180° in said first chamber and then the entire compressor discharge enters said coalescer means and passes therethrough into said third chamber in a nearly oil-free state.

2. The oil separator of claim 1 wherein an oil sump is located at the bottom of said second chamber.

3. The oil separator of claim 1 wherein said generally horizontal divider plate means is tilted 1°-6°.

4. The oil separator of claim 1 wherein a baffle means is located in said second chamber so as to divert compressor discharge after impinging upon said divider plate means and prior to passing through said demister means.

5. The oil separator of claim 1 wherein said demister mean includes a plurality of demister pads located so as to require the entire compressor discharge to pass through each of said demister pads.

6. The oil separator of claim 1 wherein said discharge deflector means defines an arcuate trough for diverting the compressor discharge through at least 90°.

7. A method for removing oil from the discharge of a horizontal screw compressor comprising the sequential steps of:

directing the compressor discharge as it leaves the compressor into contact with deflector means whereby the compressor discharge is diverted at least 90°;

causing the diverted compressor discharge to impinge upon a surface to thereby deposit entrained oil from the compressor discharge thereon and to cause the impinging compressor discharge flow to be diverted approximately 180°;

passing all of the compressor discharge flow through demister means;

causing all of the flow passing through said demister means to be diverted approximately 180° and to flow into a coalescer means;

causing all of the flow entering the coalescer means to pass therethrough; and directing the resultant essentially oil-free compressor discharge to a refrigeration system.

8. The method of claim 7 further including the step of collecting in an oil sump the oil separated from said compressor discharge due to impingement on the surface and passing through the demister means.

9. The method of claim 7 further including the step of directing the compressor discharge past a baffle prior to passing through said demister means whereby said compressor discharge is additionally diverted approximately 90°.

* * * * *